(12) United States Patent
Yang (10) Patent No.: US 8,881,081 B1
(45) Date of Patent: Nov. 4, 2014

(54) METHOD AND APPARATUS FOR EXTRACTING DELAY PARAMETER

(71) Applicant: Samsung Display Co., Ltd., Yongin (KR)

(72) Inventor: Seo-Hyeong Yang, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 14/019,108

(22) Filed: Sep. 5, 2013

(30) Foreign Application Priority Data

May 9, 2013 (KR) .................. 10-2013-0052752

(51) Int. Cl.
    *G06F 9/455* (2006.01)
    *G06F 17/50* (2006.01)

(52) U.S. Cl.
    CPC .................. *G06F 17/5081* (2013.01)
    USPC ........... 716/113; 716/101; 716/102; 716/103; 716/108

(58) Field of Classification Search
    CPC ............ G06F 17/5045; G06F 17/5068; G06F 17/5081; G06F 17/505; G06F 17/50; G06F 17/5036; G06F 17/5072
    USPC .......................... 716/101, 102, 103, 108, 113
    See application file for complete search history.

(56) References Cited

U.S. PATENT DOCUMENTS

| | | | | |
|---|---|---|---|---|
| 5,838,581 | A * | 11/1998 | Kuroda | 716/114 |
| 6,009,252 | A * | 12/1999 | Lipton | 716/112 |
| 6,286,126 | B1 * | 9/2001 | Raghavan et al. | 716/113 |
| 6,701,289 | B1 * | 3/2004 | Garnett et al. | 703/14 |
| 7,299,438 | B2 * | 11/2007 | Hosono | 716/113 |
| 2003/0177464 | A1 * | 9/2003 | Takechi et al. | 716/10 |
| 2004/0044974 | A1 | 3/2004 | Sharma et al. | |
| 2006/0109032 | A1 * | 5/2006 | Hosono | 327/41 |
| 2007/0094622 | A1 * | 4/2007 | Lee et al. | 716/4 |
| 2007/0148794 | A1 * | 6/2007 | Cha et al. | 438/14 |
| 2007/0300196 | A1 * | 12/2007 | Ishibashi et al. | 716/6 |
| 2009/0007035 | A1 * | 1/2009 | Su et al. | 716/5 |
| 2009/0243393 | A1 * | 10/2009 | Miyahara et al. | 307/80 |
| 2009/0276746 | A1 * | 11/2009 | Nagai | 716/6 |
| 2011/0023003 | A1 * | 1/2011 | Su et al. | 716/133 |
| 2013/0219352 | A1 * | 8/2013 | Ishikawa et al. | 716/108 |
| 2013/0227501 | A1 * | 8/2013 | Yang et al. | 716/102 |
| 2014/0007031 | A1 * | 1/2014 | Huang et al. | 716/112 |

FOREIGN PATENT DOCUMENTS

| | | |
|---|---|---|
| JP | 2005-309792 | 11/2005 |
| KR | 10-2001-0029612 | 4/2001 |
| KR | 10-2005-0039863 | 4/2005 |
| KR | 10-2011-0103021 | 9/2011 |

* cited by examiner

*Primary Examiner* — Thuan Do
*Assistant Examiner* — Brian Ngo
(74) *Attorney, Agent, or Firm* — H.C. Park & Associates, PLC (57) ABSTRACT

A delay parameter extracting apparatus includes a schematic composing unit, a layout composing unit, a verification unit, and a parameter extracting unit. The schematic composing unit is configured to: facilitate design of a schematic circuit; and generate a first net list based on the design of the schematic circuit. The layout composing unit is configured to: facilitate design of a layout based on the schematic circuit; and generate a second net list based on the design of the layout. The verification unit is configured to verify the layout by comparing the first net list to the second net list. The parameter extracting unit is configured to: extract capacitance (C) values from the layout; and extract delay parameters based on the C values with respect to respective nets according to types of delay parameters associated with the respective nets.

20 Claims, 4 Drawing Sheets

METHOD AND APPARATUS FOR EXTRACTING DELAY PARAMETER

CROSS-REFERENCE TO RELATED APPLICATION

This application claims priority from and the benefit of Korean Patent Application No. 10-2013-0052752, filed on May 9, 2013, which is incorporated by reference for all purposes as if set forth herein.

BACKGROUND

1. Field

Exemplary embodiments relate to a method and an apparatus for extracting delay parameters of a display panel.

2. Discussion

As semiconductor fabrication becomes miniaturized and circuit magnitude increases, sizes of circuit devices increase. As such, the effects of resistance-capacitance (RC) parasitics become more significant. Parasitics, such as coupling capacitance, cause issues including, for instance, cross-talk, noise, etc. Furthermore, as the size of a panel increases, current-resistance (IR) drop becomes more significant. In this manner, the importance of RC modeling is increasing.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a method of effectively and efficiently extracting resistance-capacitance (RC) elements with a reduced period of time that elapses for post-simulation during the design of a circuit.

Exemplary embodiments provide an apparatus configured to facilitate effective and efficient extraction of delay parameters.

Additional aspects will be set forth in the detailed description which follows and, in part, will be apparent from the disclosure, or may be learned by practice of the invention.

According to exemplary embodiments, a delay parameter extracting apparatus includes: a schematic composing unit, a layout composing unit, a verification unit, and a parameter extracting unit. The schematic composing unit is configured to: facilitate design of a schematic circuit; and generate a first net list based on the design of the schematic circuit. The layout composing unit is configured to facilitate design of a layout based on the schematic circuit; and generate a second net list based on the design of the layout. The verification unit is configured to verify the layout by comparing the first net list to the second net list. The parameter extracting unit is configured to: extract capacitance (C) values from the layout; and extract delay parameters based on the C values with respect to respective nets according to types of delay parameters associated with the respective nets.

According to exemplary embodiments, a method of extracting delay parameters, includes: generating a first net list based on a schematic circuit; generating a layout based on the schematic circuit; generating a second net list based on the layout; storing the first and second net lists in one or more storage devices; verifying the layout by comparing the first net list to the second net list; extracting capacitance (C) values from the layout; and extracting delay parameters based on the C values with respect to respective nets according to types of delay parameters associated with the respective nets.

According to exemplary embodiments, an apparatus includes: at least one processor; and at least one memory including computer code, the computer code being configured, when executed by the at least one processor, to cause the apparatus at least to: generate a first net list based on reception of a schematic circuit design; generate a second net list based on reception of a physical layout of the schematic circuit design; verify the physical layout based on comparison of the first net list against the second net list; extract capacitance (C) values from the physical layout; and extract delay parameters based on the C values with respect to respective nets according to types of delay parameters associated with the respective nets.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

When an element or component is referred to as being "on," "connected to," or "coupled to" another element or component, it may be directly on, connected to, or coupled to the other element or component or intervening elements or components may be present. When, however, an element or component is referred to as being "directly on," "directly connected to," or "directly coupled to" another element or component, there are no intervening elements or components present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, etc., these elements, components, etc., should not be limited by these terms. These terms are used to distinguish one element, component, etc., from another element, component, etc. As such, a first element, component, etc., discussed below could be termed a second element, component, etc., without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Although exemplary embodiments are described in association with circuit simulation with respect to display panel circuits, it is contemplated that exemplary embodiments may be utilized in association with other or equivalent circuits, such as, for example, integrated circuits, consumer electronic circuits, etc.

Figure 1:
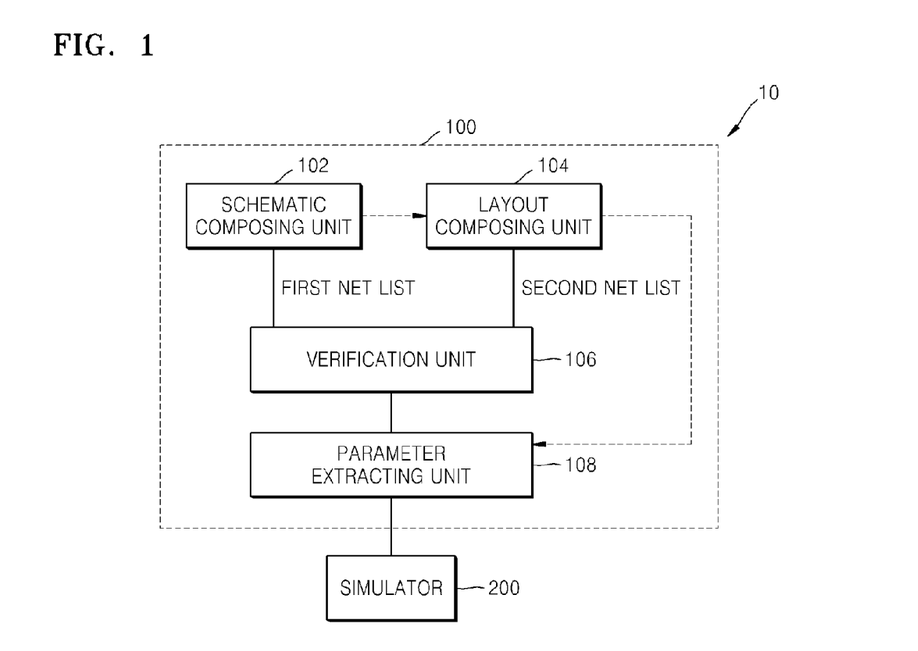
FIG. 1 is a schematic block diagram showing a configuration of a delay parameter extracting device, according to exemplary embodiments.

FIG. 1 is a schematic block diagram showing a configuration of a delay parameter extracting device 100, according to exemplary embodiments.

Referring to FIG. 1, a circuit simulation device 10 includes the delay parameter extracting device 100 and a simulator 200. Although specific reference will be made to this particular implementation, it is also contemplated that circuit simulation device 100 may embody many forms and include multiple and/or alternative components. For example, it is contemplated that the components of circuit simulation device 100 may be combined, located in separate structures, and/or separate locations.

The delay parameter extracting device 100 may include a schematic composing unit 102, a layout composing unit 104, a verification unit 106, and a parameter extracting unit 108.

The schematic composing unit 102 is configured to facilitate design of a schematic circuit using a predetermined schematic tool. The schematic circuit is a diagram showing connection relationships among circuit devices and may utilize gates (e.g., logic expressions like AND, OR, NOR, etc.), digital logic devices, etc. The schematic composing unit 102 is configured to generate a first netlist corresponding to the designed schematic circuit. A netlist is a text file including a mutual connection relationship among circuit devices, which indicates types of devices used in a circuit and nodes (or net names). The schematic composing unit 102 may be configured to facilitate design of an optical schematic circuit by simulating designed schematic circuits.

The layout composing unit 104 is configured to facilitate design of a layout based on a designed schematic circuit. Each circuit device of the schematic circuit may be designed as a pattern (or wiring) of a material layer, such as a conductive layer, a semiconductor layer, and an insulation layer, etc., where the layout is a diagram in which such patterns are vertically and horizontally arranged and connected according to the designed schematic circuit. The layout composing unit 104, according to exemplary embodiments, is configured to facilitate design of a layout via a full custom layout, which is a method of manually designing a layout. Therefore, a layout optimized according to user demands may be designed. The layout composing unit 104 is configured to generate a second netlist corresponding to the designed layout.

The verification unit 106 is configured to perform a layout versus schematic (LVS) process to check whether a designed layout is identical to a corresponding schematic circuit. The verification unit 106 is configured to verify a layout by comparing the first netlist to a second netlist, and, if there is an inconsistency, the verification unit 106 may correct at least one of the schematic circuit and the layout.

When a layout is verified, the parameter extracting unit 108 is configured to extract primary capacitance (C) values with respect to respective nets of the layout according to one or more determined resistance-capacitance (RC) extraction rules. To this end, the parameter extracting unit 108 is configured to extract delay parameters with respect to the respective nets based on the primary C values according to respective types of delay parameters set to each net. Delay parameters extracted from the respective nets may be different from one another. For example, RC values may be extracted from some of the nets, only C values may be extracted from some other nets, and the other nets may be ignored and no delay parameters may be extracted therefrom. In this manner, the C values are primary C values. Hereinafter, nets from which RC values are extracted will be referred to as critical nets. The parameter extracting unit 108 is configured to generate a single result file by combining delay parameter values extracted with respect to the respective nets. It is contemplated, however, that the parameter extracting unit 108 may be configured to alternatively or additionally generate multiple result files.

As a size of, for example, a display panel increases, IR drop becomes more significant, and, as such, the importance of RC modeling is increasing. Furthermore, the amount of data regarding RC values in a large display panel is greater than the amount of data regarding RC values in a smaller display panel. Therefore, a period of time for performing post-simulation increases as the amount of data regarding RC values increases.

For example, if RC values are extracted with respect to all nets and post simulation is performed, or a post simulation is performed with respect to only simple modelling and the overall RC values are calculated, the amount of data regarding RC values (R values, C values, and RC values) becomes excessively large, thereby, increasing post simulation time. When RC values are extracted with respect to all nets, coupling capacitance values regarding floating nodes may also be extracted. Furthermore, if RC values are calculated by simple-modelling resistances and capacitances and a post simulation is performed thereon, the accuracy of a result thereof may be significantly compromised.

According to exemplary embodiments, the amount of data regarding unnecessary nodes is reduced or the data regarding unnecessary nodes is eliminated, thereby, efficiently extracting data regarding RC values within a relatively shorter period of time and reducing the amount of the data regarding RC values.

Exemplary parameter extracting units 108 will be described in more detail in association with FIGS. 2-4.

With continued reference to FIG. 1, the simulator 200 is configured to receive a delay parameter file, which is a result file from the delay parameter extracting device 100 and reflects delay parameter values in the designed schematic circuit. To this end, the simulator 200 is configured to perform a post simulation thereon, which checks operation of the schematic circuit based on one or more design rules. In this manner, the parameter extracting unit 108 may be configured to operate in conjunction with the verification unit 106 to determine whether the circuit design adheres to the design rule(s). The design rules may be established according to various factors, such as industry experience, manufacturing tolerances, best-practices, desired operational performance, etc. Based on a result of the post simulation, the schematic composing unit 102 may modify the schematic circuit. It is noted that the modification may be automated or may be facilitated by one or more users. For instance, the simulator 200 may operate in conjunction with the schematic composing unit 102 to report errors and/or design rule infractions in the design of a circuit, as well as suggest various operations or design changes to fix (or otherwise alleviate) the errors/infractions. To this end, each of the aforementioned features/processes may be carried out again based on one or more modifications resulting from changes in the circuit design imposed based on the results from the simulator 200.

According to exemplary embodiments, the delay parameter extracting device 100, the simulator 200, and/or one or more components thereof may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

In exemplary embodiments, the processes described herein for circuit simulation, verification, delay parameter extraction, etc., may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. In this manner, the delay parameter extracting device 100, the simulator 200, and/or one or more components thereof may include or otherwise be associated with one or more memories (not shown) including code (e.g., instructions) configured to cause the delay parameter extracting device 100, the simulator 200, and/or one or more components thereof to perform one or more of the features/functions/processes described herein.

The memories may be any medium that participates in providing code/instructions to the one or more software, hardware, and/or firmware for execution. Such memories may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Figure 2:
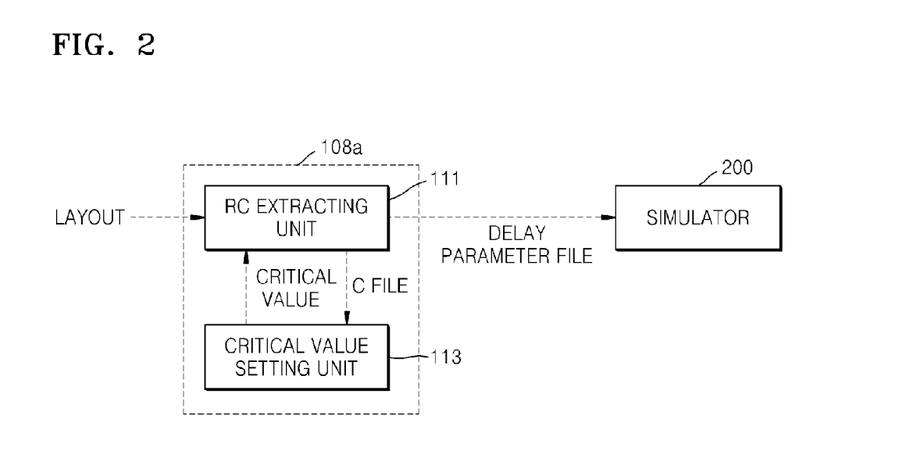
FIG. 2 is a schematic block diagram showing a configuration of a parameter extracting unit, according to exemplary embodiments.

FIG. 2 is a schematic block diagram showing a configuration of a parameter extracting unit 108a, according to exemplary embodiments.

Referring to FIG. 2, the parameter extracting unit 108a may include an RC extracting unit 111 and a critical value setting unit 113. The RC extracting unit 111 is configured to generate a C file by extracting primary C values from a layout with respect to respective nets. The critical value setting unit 113 is configured to set (or otherwise establish) a critical value of capacitance for dividing C values of a C file into sectors. The critical value setting unit 113 may determine a first sector in which RC values are extracted, a second sector in which only C values are extracted, and a third sector in which corresponding nets are ignored, by setting critical values. Each of the sectors may include one or more sectors. Critical values for dividing sectors are not limited and may vary according to display panels.

The critical value setting unit 113 may determine a C value of a node having a plurality of branches as a critical value for determining a second sector. When a plurality of branches are formed (e.g., power (or transmission) lines), if R values are extracted, the R values may be extracted from the respective branches, and, as such, the amount of data becomes very large. Therefore, the C value of a node having a plurality of branches may be determined as a critical value for determining a second sector. Furthermore, the critical value setting unit 113 may determine a C value of a floating node as a critical value for determining a third sector. Since a floating node may be ignored, the C value of a floating node may be determined as a critical value for determining a third sector.

The RC extracting unit 111 may compare the primary C values of a C file to a set critical value and determine sectors to which respective nets belong. The RC extracting unit 111 may extract RC values with respect to nets having C values corresponding to a first sector. The RC extracting unit 111 may extract only C values with respect to nets having C values corresponding to a second sector. The RC extracting unit 111 may ignore nets having C values corresponding to a third sector.

For example, the critical value setting unit 113 may set a first critical value for determining a second sector and a second critical value for determining a third sector. The RC extracting unit 111 may extract only C values with respect to nets having C values greater than the first critical value, and may extract RC values with respect to nets having C values between the first critical value and the second critical value.

According to exemplary embodiments, the critical value setting unit 113 may set one or more additional critical values between a first critical value and a second critical value, e.g., a third critical value, for finer sector division, thereby, extracting more precise delay parameters. In this manner, it is contemplated that the circuit simulation device 10 may enable users to adjust the level of granularity in the design analysis and verification processes. In exemplary embodiments, the RC extracting unit 111 may extract only C values with respect to nets having C values greater than the first critical value, may ignore nets having C values smaller than the second critical value, may extract only C values with respect to nets having C values between the first critical value and the third critical value, and may extract RC values with respect to nets having C values between the third critical value and the second critical value.

In exemplary embodiments, the RC extracting unit 111 is configured to generate a delay parameter file including data regarding final C values or final RC values. The delay parameter file is a single result file including data regarding delay parameters of the respective nets. As previously mentioned, however, it is contemplated that one or more output delay parameter files may be utilized.

The delay parameter file is output to the simulator 200.

Methods by which the RC extracting unit 111 extracts R values and C values are not limited and any of various methods may be used. For example, the RC extracting unit 111 may extract R values and C values regarding nets using a maximum reference resistance Rmax, a minimum reference resistance Rmin, a maximum reference capacitance Cmax, a minimum reference capacitance Cmin, etc.

Figure 3:
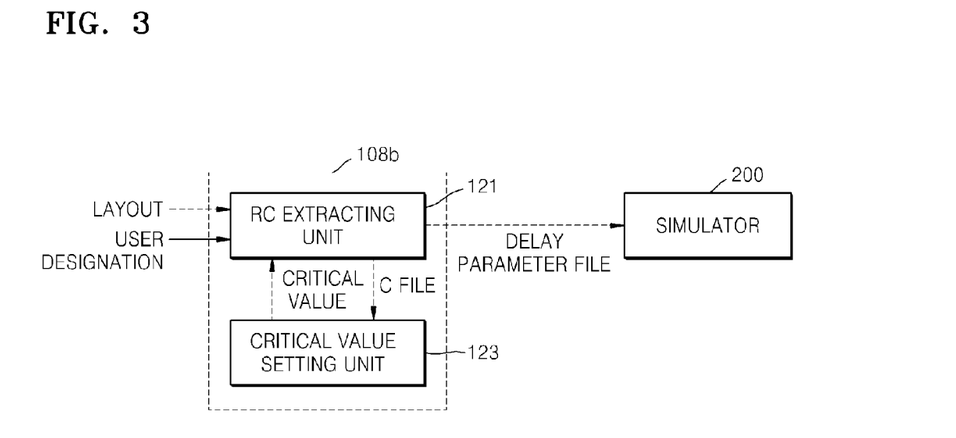
FIG. 3 is a schematic block diagram showing a configuration of a parameter extracting unit, according to exemplary embodiments.

FIG. 3 is a schematic block diagram showing a configuration of a parameter extracting unit 108b, according to exemplary embodiments.

Referring to FIG. 3, the parameter extracting unit 108b may include an RC extracting unit 121 and a critical value setting unit 123. The RC extracting unit 121 is configured to extract primary C values from a layout with respect to respective nets and generates a C file. The critical value setting unit 123 is configured to set critical values of capacitance for dividing C values into sectors based on the C values of the C file. The critical value setting unit 123 may determine a first sector in which RC values are extracted, a second sector in which only C values are extracted, and a third sector in which corresponding nets are ignored, by setting critical values. Each of the sectors may include one or more sectors.

According to exemplary embodiments, the RC extracting unit 121 may compare the primary C values of a C file to a set critical value and determine sectors to which respective nets belong. The RC extracting unit 121 may extract RC values with respect to nets having C values corresponding to a first sector. The RC extracting unit 121 may extract only C values with respect to nets having C values corresponding to a second sector. The RC extracting unit 121 may ignore nets having C values corresponding to a third sector.

The RC extracting unit 121 may be further configured to generate a delay parameter file including data regarding final C values and/or final RC values. The delay parameter file is a single result file including data regarding delay parameters of the respective nets. As previously mentioned, however, the RC extracting unit 121 may be configured to generate one or more result files.

The delay parameter file may be output to the simulator 200.

According to exemplary embodiments, even if critical values are set by the critical value setting unit 123 and sectors are determined based on the critical values, the RC extracting unit 121 may be configured to extract delay parameters as designated by a user, if the user inputs the designation. For example, even if a net corresponds to a second sector or a third sector, if a user designates to extract an RC value from the net, the RC extracting unit 121 may extract an RC value from the corresponding net instead of extracting only a C value therefrom or ignoring the corresponding net.

The other configurations and operations of the RC extracting unit 121 and the critical value setting unit 123 are identical to those described above with reference to FIG. 2, and, as such, detailed descriptions thereof are omitted to avoid obscuring exemplary embodiments described herein.

Figure 4:
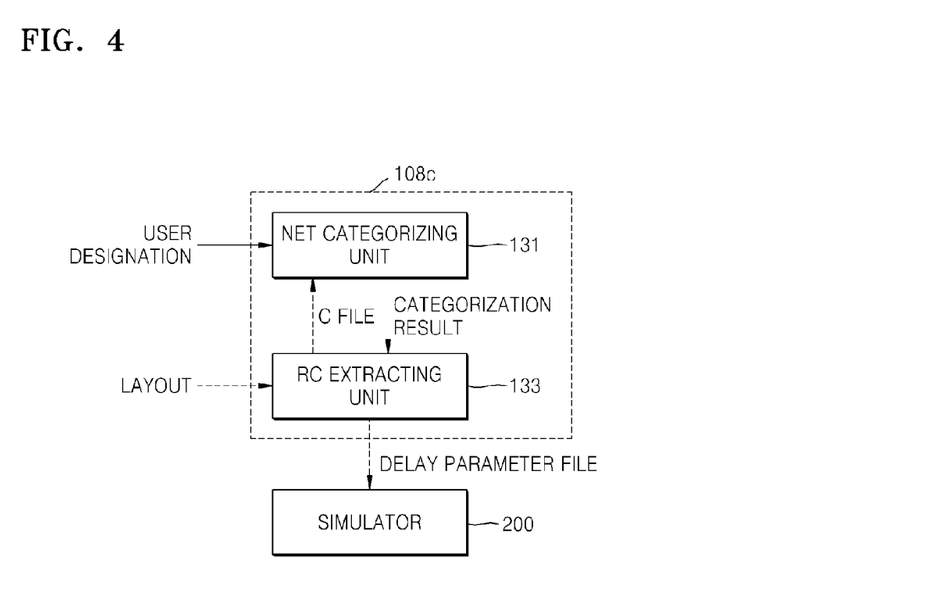
FIG. 4 is a schematic block diagram showing a configuration of a parameter extracting unit, according to exemplary embodiments.

FIG. 4 is a schematic block diagram showing a configuration of a parameter extracting unit 108c, according to exemplary embodiments.

Referring to FIG. 4, the parameter extracting unit 108c may include a net categorizing unit 131 and an RC extracting unit 133. The net categorizing unit 131 may categorize nets into a first net portion from which the RC extracting unit 133 extracts RC values, a second net portion from which the RC extracting unit 133 extracts only C values, and a third net portion that is ignored by the RC extracting unit 133, as designated by a user. A user may categorize nets based on primary C values of a C file and/or any other one or more categorization standards or rules. The net categorizing unit 131 may categorize a second net portion based on a C value of a node having a plurality of branches and may categorize a third net portion based on a C value of a floating node.

The RC extracting unit 133 may extract RC values with respect to nets having C values corresponding to a first sector. The RC extracting unit 133 may extract only C values with respect to nets having C values corresponding to a second sector. The RC extracting unit 133 may ignore nets having C values corresponding to a third sector and may not extract delay parameters.

According to exemplary embodiments, the RC extracting unit 133 is configured to generate a delay parameter file including data regarding final C values or final RC values. The delay parameter file is a single result file including data regarding delay parameters of the respective nets. Again, as previously mentioned, the RC extracting unit 133 may be configured to generate one or more result files.

The delay parameter file may be output to the simulator 200.

Figure 5:
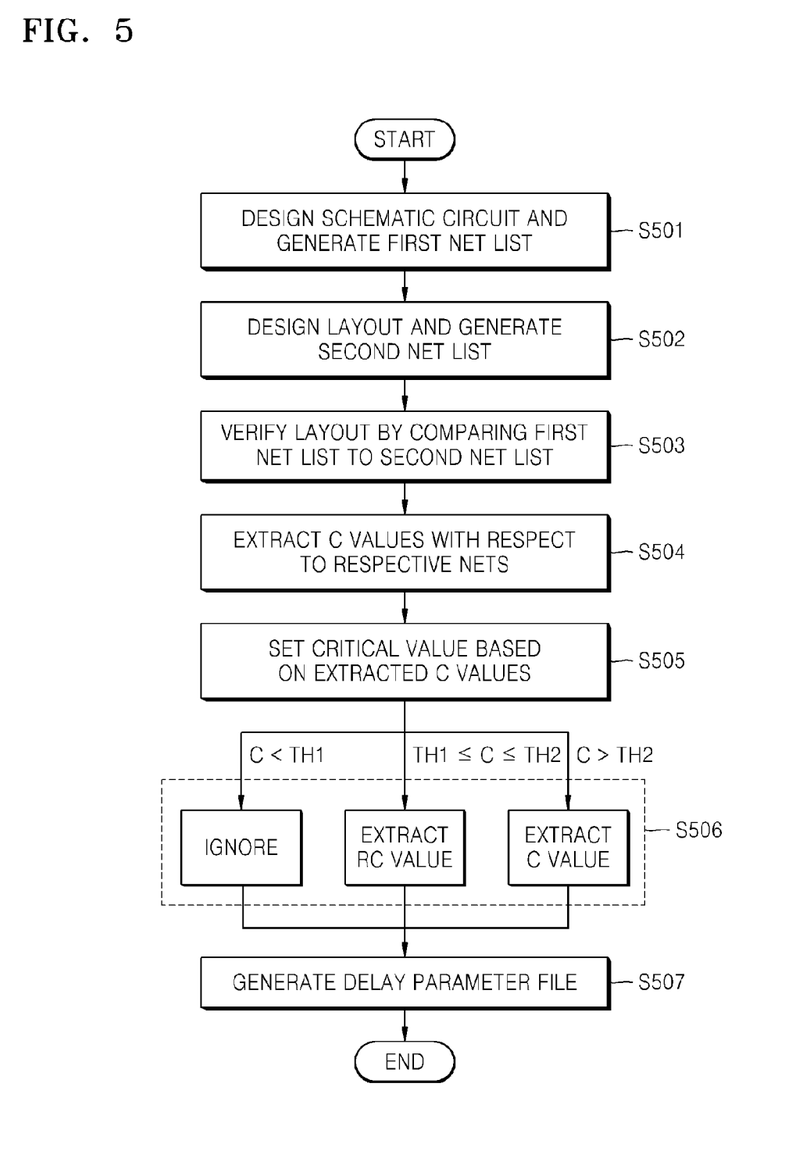
FIG. 5 is a flowchart of a process to extract delay parameters, according to exemplary embodiments.

FIG. 5 is a flowchart of a process to extract delay parameters, according to exemplary embodiments.

Referring to FIG. 5, a schematic composing unit 102 first designs a schematic circuit (which may be supplemented by one or more user inputs) and generates a first net list (operation S501).

A layout composing unit 104 designs a layout (which may be supplemented by one or more user inputs) based on the schematic circuit and generates a second net list (operation S502).

A verification unit 106 verifies a layout by comparing the first netlist to the second netlist (operation S503). The verification unit 106 may perform a layout versus schematic (LVS) process to check whether the layout is identical to the corresponding schematic circuit.

A parameter extracting unit 108 extracts primary C values with respect to respective verified nets of the layout and generates a C file (operation S504). The parameter extracting unit 108 extracts primary C values with respect to respective nets of the layout according to one or more determined RC extraction rules.

In exemplary embodiments, the parameter extracting unit 108 sets critical values of capacitance based on the C values of the C file (operation S505). The parameter extracting unit 108 may determine a first sector in which RC values are extracted, a second sector in which only C values are extracted, and a third sector in which corresponding nets are ignored, by setting critical values. Each of the sectors may include one or more sectors. For example, the parameter extracting unit 108 may set a C value of a floating node as a first critical value TH1 and set a C value of a node having a plurality of branches as a second critical value TH2 and may determine C values between the first critical value TH1 and the second critical value TH as a first sector, C values greater than the second critical value TH2 as a second sector, and C values smaller than the first critical value TH1 as a third sector.

The parameter extracting unit 108 extracts delay parameters by extracting RC values, extracting C values, or ignoring corresponding nets with respect to the respective sector (operation S506). For example, if a primary C value is smaller than the first critical value TH1, the parameter extracting unit may ignore the corresponding net. If a primary C value is greater than the second critical value TH2, the parameter extracting unit may extract only a C value with respect to the corresponding net (that is, the primary C value is used as-is). If a primary C value is between the first critical value TH1 and the second critical value TH2, the parameter extracting unit may extract an RC value with respect to the corresponding net.

The parameter extracting unit 108 may combine extracted delay parameters and generate a single delay parameter file (operation S507).

Figure 6:
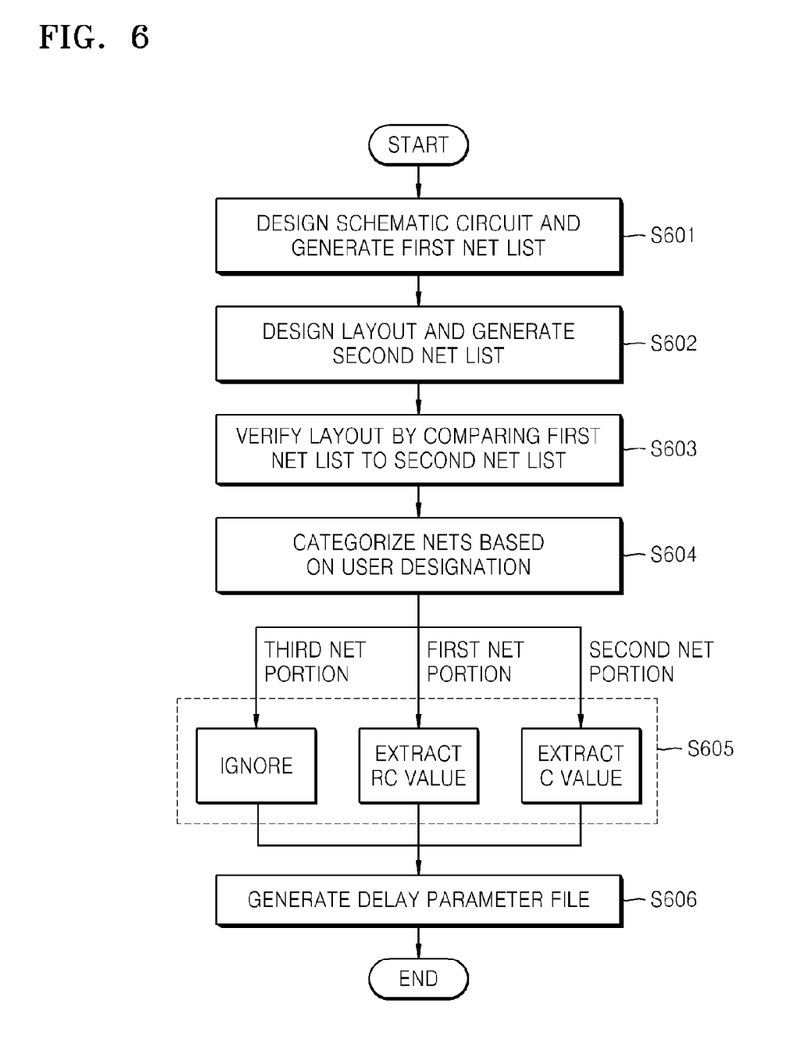
FIG. 6 is a flowchart of a process to extract delay parameters, according to exemplary embodiments.

FIG. 6 is a flowchart of a process to extract delay parameters, according to exemplary embodiments.

Referring to FIG. 6, a schematic composing unit 102 first designs a schematic circuit and generates a first net list (operation S601). It is noted that the design of the schematic circuit may be supplemented by one or more user inputs.

A layout composing unit 104 designs a layout based on the schematic circuit and generates a second net list (operation S602). As with the design of the schematic circuit, the design of the layout may be supplemented by one or more user inputs.

A verification unit 106 verifies the layout by comparing the first netlist to the second netlist (operation S603). The verification unit may perform a layout versus schematic (LVS) process to check whether the layout is identical to the corresponding schematic circuit.

The parameter extracting unit 108 categorizes nets as designated by a user (operation S604). For example, a user may set a net categorization standard according to primary C values, and the parameter extracting unit 108c may categorize nets into a first net portion from which the RC extracting unit 133 extracts RC values, a second net portion from which the RC extracting unit 133 extracts only C values, and a third net portion that is ignored by the RC extracting unit 133, according to the net categorization standard. The parameter extracting unit 108 may categorize a second net portion based on a C value of a node having a plurality of branches and may categorize a third net portion based on a C value of a floating node.

The parameter extracting unit 108 may extract delay parameters with respect to the respective categorized nets (operation S605). For example, the parameter extracting unit 108 may extract RC values with respect to nets categorized to a first sector. The parameter extracting unit 108 may extract only C values with respect to nets categorized to a second sector. The parameter extracting unit may ignore nets categorized to a third sector.

The parameter extracting unit 108 may combine the extracted delay parameters and generates a single delay parameter file (operation S606).

According to exemplary embodiments, primary C values extracted from a layout are categorized into a plurality of sectors, RC values are extracted with respect to a critical net sector, and C values are extracted with respect to the other nets or the other nets are ignored. In other words, according to exemplary embodiments, RC extraction is performed differently with respect to each of the sectors to reduce the overall amount of RC data to be used later in a simulation, whereas RC data is used with respect to critical nets. Therefore, a period of time elapsed for post-simulation may be reduced without deteriorating the precision of the simulation. Therefore, the performance of a circuit may be analyzed and verified precisely and quickly.

Although certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A delay parameter extracting apparatus, comprising:
a schematic composing unit configured to:
facilitate design of a schematic circuit; and
generate a first net list based on the design of the schematic circuit;
a layout composing unit configured to:
facilitate design of a layout based on the schematic circuit; and
generate a second net list based on the design of the layout;
a verification unit configured to verify the layout by comparing the first net list to the second net list; and
a parameter extracting unit configured to:
extract capacitance (C) values from the layout; and
extract delay parameters based on the C values with respect to respective nets according to types of delay parameters associated with the respective nets,
wherein the parameter extracting unit comprises:
a critical value setting unit configured to:
set critical values for dividing the C values into sectors; and
determine a first sector for extracting resistance-capacitance (RC) values, a second sector for extracting only C values, and a third sector for ignoring corresponding nets; and
an RC extracting unit configured to:
extract RC values with respect to nets comprising C values corresponding to the first sector;
extract only C values with respect to nets comprising C values corresponding to the second sector; and
ignore nets comprising C values corresponding to the third sector.

2. The delay parameter extracting apparatus of claim 1, wherein the RC extracting unit is configured to extract, according to user designation, RC values with respect to nets having C values corresponding to the second sector or the third sector.

3. The delay parameter extracting apparatus of claim 1, wherein the critical value setting unit is configured to:
set a C value of a node comprising branches as a first critical value for determining the second sector; and
set a C value of a floating node as a second critical value for determining the third sector.

4. The delay parameter extracting apparatus of claim 1, wherein each of the first through third sectors comprises one or more sectors.

5. The delay parameter extracting apparatus of claim 1, wherein the parameter extracting unit is configured to:
combine delay parameters extracted from the respective sectors; and
generate a result file based on the combined delay parameters.

6. A delay parameter extracting apparatus comprising:
a schematic composing unit configured to:
facilitate design of a schematic circuit; and
generate a first net list based on the design of the schematic circuit;
a layout composing unit configured to:
facilitate design of a layout based on the schematic circuit; and generate a second net list based on the design of the layout;
a verification unit configured to verify the layout by comparing the first net list to the second net list; and
a parameter extracting unit configured to:
extract capacitance (C) values from the layout; and
extract delay parameters based on the C values with respect to respective nets according to types of delay parameters associated with the respective nets,
wherein the parameter extracting unit comprises:
a net categorizing unit configured to categorize, based on user designation, the nets into a first net portion for extracting resistance-capacitance (RC) values, a second net portion for extracting only C values, and a third net portion to be ignored; and
an RC extracting unit configured to:
extract RC values with respect to nets corresponding to the first net portion;
extract only C values with respect to nets corresponding to the second net portion; and
ignore nets corresponding to the third net portion.

7. The delay parameter extracting apparatus of claim 6, wherein the net categorizing unit is configured to:
categorize the second net portion based on a C value of a node comprising branches; and
categorize the third net portion based on a C value of a floating node.

8. The delay parameter extracting apparatus of claim 6, wherein the parameter extracting unit is configured to:
combine delay parameters extracted from the respective net portions; and
generate a result file based on the combined delay parameters.

9. A method of extracting delay parameters via one or more processors, the method comprising:
generating a first net list based on a schematic circuit;
generating a layout based on the schematic circuit;
generating a second net list based on the layout;
verifying the layout by comparing the first net list to the second net list;
extracting, via the one or more processors, capacitance (C) values from the layout; and
extracting, via the one or more processors, delay parameters based on the C values with respect to respective nets according to types of delay parameters associated with the respective nets,
wherein extracting of the delay parameters via the one or more processors comprises:
setting critical values for dividing the C values into sectors;
determining a first sector for extracting resistance-capacitance (RC) values, a second sector for extracting only C values, and a third sector for ignoring corresponding nets;
extracting RC values with respect to nets comprising C values corresponding to the first sector;
extracting only C values with respect to nets comprising C values corresponding to the second sector; and
ignoring nets comprising C values corresponding to the third sector.

10. The method of claim 9, wherein extracting the delay parameters via the one or more processors further comprises:
extracting, according to user designation, RC values with respect to nets comprising C values corresponding to the second sector or the third sector.

11. The method of claim 9, wherein a C value of a node comprising branches is set as a first critical value for determining the second sector and a C value of a floating node is set as a second critical value for determining the third sector.

12. The method of claim 9, wherein each of the first through third sectors comprises one or more sectors.

13. The method of claim 9, further comprising:
combining delay parameters extracted from the respective sectors; and
generating a result file based on the combined delay parameters.

14. A method of extracting delay parameters via one or more processors, the method comprising:
generating a first net list based on a schematic circuit;
generating a layout based on the schematic circuit;
generating a second net list based on the layout;
verifying the layout by comparing the first net list to the second net list;
extracting, via the one or more processors, capacitance (C) values from the layout; and
extracting, via the one or more processors, delay parameters based on the C values with respect to respective nets according to types of delay parameters associated with the respective nets,
wherein extracting the delay parameters via the one or more processors comprises:
categorizing, based on user designation, the nets into a first net portion for extracting resistance-capacitance (RC) values, a second net portion for extracting only C values, and a third net portion to be ignored;
extracting RC values with respect to nets corresponding to the first net portion;
extracting only C values with respect to nets corresponding to the second net portion; and
ignoring nets corresponding to the third net portion.

15. The method of claim 14, wherein the second net portion is categorized based on a C value of a node comprising branches and the third net portion is categorized based on a C value of a floating node.

16. The method of claim 14, further comprising:
combining delay parameters extracted from the respective net portions; and
generating a result file based on the combined delay parameters.

17. An apparatus, comprising:
at least one processor; and
at least one memory comprising computer code, the computer code being configured to, when executed by the at least one processor, cause the apparatus at least to:
generate a first net list based on reception of a schematic circuit design;
generate a second net list based on reception of a physical layout of the schematic circuit design;
verify the physical layout based on comparison of the first net list against the second net list;
extract capacitance (C) values from the physical layout; and
extract delay parameters based on the C values with respect to respective nets according to types of delay parameters associated with the respective nets,
wherein extraction of the delay parameters comprises:
establishment of critical values to divide the C values into at least a first, second and third sector;
extraction of resistance-capacitance (RC) values with respect to nets comprising C values corresponding to the first sector;
extraction of only C values with respect to nets comprising C values corresponding to the second sector; and disregardance of nets comprising C values corresponding to the third sector.

18. The apparatus of claim 17, wherein the computer program code is further configured to, when executed by the at least one processor, cause the apparatus at least to:
  combine delay parameters extracted from the respective sectors; and
  generate a result file based on the combined delay parameters.

19. An apparatus, comprising:
  at least one processor; and
  at least one memory comprising computer code, the computer code being configured to, when executed by the at least one processor, cause the apparatus at least to:
    generate a first net list based on reception of a schematic circuit design;
    generate a second net list based on reception of a physical layout of the schematic circuit design;
    verify the physical layout based on comparison of the first net list against the second net list;
    extract capacitance (C) values from the physical layout; and
    extract delay parameters based on the C values with respect to respective nets according to types of delay parameters associated with the respective nets,
  wherein extraction of the delay parameters comprises:
    categorization, based on user designation, of the nets into a first, second, and third net portion;
    extraction of resistance-capacitance (RC) values with respect to nets corresponding to the first net portion;
    extraction of C values with respect to nets corresponding to the second net portion; and
    disregardance of nets corresponding to the third net portion.

20. The apparatus of claim 19, wherein the computer program code is further configured to, when executed by the at least one processor, cause the apparatus at least to:
  combine delay parameters extracted from the respective net portions; and
  generate a result file based on the combined delay parameters.

* * * * *